United States Patent Office 3,432,510
Patented Mar. 11, 1969

3,432,510
PYRIDINECARBOXYLIC ACID ESTERS OF
PYRIDINEDIMETHANOLS
Carl Peter Krimmel, Wauconda, Ill., assignor to G. D. Searle & Co., Chicago, Ill., a corporation of Delaware
No Drawing. Filed July 18, 1966, Ser. No. 565,746
U.S. Cl. 260—295.5
Int. Cl. C07d 31/36
2 Claims

ABSTRACT OF THE DISCLOSURE

Esters of pyridinedimethanols and pyridinecarboxylic acids are described herein. The esters are prepared by the reaction of a pyridinedimthanol with a pyridinecarboxylic acid halide. These compounds possess anti-atherogenic activity and they inhibit germination of seeds of trifolium.

---

The present invention relates to a group of compounds which are esters of pyridinedimethanols. In particular, the present invention relates to a group of compounds having the following general formula

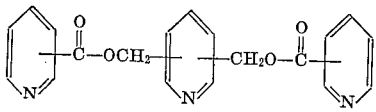

The acid portion of these esters is derived from a pyridinecarboxylic acid; it can be picolinic, nicotinic, or isonicotinic acid. The alcohol portion of these compounds is derived from the isomeric pyridinedimethanols.

Also encompassed by this invention are the non-toxic salts of the aforementioned organic bases, as exemplified by the hydrochloride, hydrobromide, hydriodide, tartrate, succinate, malate, acetate, citrate, ascorbate, nitrate, sulfate, phosphate, and sulfamate. The present compounds also form quaternary ammonium salts with a variety of organic esters of sulfuric, hydrohalic, and aromatic sulfonic acids. Among such esters are methyl chloride, bromide, and iodide; ethyl chloride, propyl chloride, butyl chloride, and benzyl chloride and bromide.

The compounds of this invention are prepared by the reaction of the appropriate pyridinedimethanol with a pyridinecarboxylic acid halide. The acid chloride is preferred for this reaction. The reaction can be carried out in the presence of a tertiary amine which reacts with the hydrogen chloride formed in the reaction. Pyridine is useful for this purpose and an excess of this amine can be used as the solvent for the reaction.

The present compounds are useful because of their pharmacological properties. In particular, they possess anti-atherogenic activity. Thus, they have been found to reduce serum triglycerides; they have also been found to bring about a reduction in the serum chylomicron count. The compounds of the present invention are also inhibitors of germination of seeds of trifolium.

The following examples are presented to further illustrate this invention; they should not be construed as limiting it in spirit or in scope. In these examples, quantities by weight are indicated in grams, quantities by volume are indicated in milliliters, and temperatures are indicated in degrees centigrade (° C.).

EXAMPLE 1

A mixture of 36.9 grams of nicotinic acid and 100 ml. of thionyl chloride is refluxed for 2 hours. The mixture is then heated on a steam bath under reduced pressure to remove the excess thionyl chloride. Azeotropically dried benzene is added to the residue and the mixture is again heated under reduced pressure to remove the final traces of thionyl chloride.
The residual nicotinoyl chloride hydrochloride is suspended in 100 ml. of anhydrous pyridine and to it is added, with stirring, a suspension of 20.6 grams of 2,6-pyridinedimethanol in 100 ml. of anhydrous pyridine. The resultant mixture is heated on a steam bath for 2 hours and then distilled on a steam bath under reduced pressure to remove the pyridine. The residual solid is pulverized with 150 ml. of water and then filtered and the precipitate is washed with water and dried. The solid is then recrystallized, first from 2-propanol and then from benzene, to give 2,6-pyridinedimethanol dinicotinoate melting at about 122–125° C. This compound has the following formula

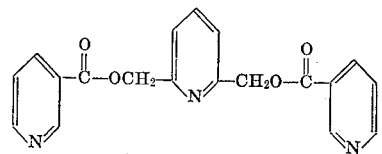

EXAMPLE 2

Isonicotinoyl chloride hydrochloride is prepared from 26.2 grams of isonicotinic acid and 80 ml. of thionyl chloride according to the procedure described in the first paragraph of Example 1 for the preparation of nicotinoyl chloride. The resultant crude acid chloride is suspended in 80 ml. of anhydrous pyridine and to it is added, with stirring, a suspension of 14.6 grams of 2,6-pyridinedimethanol in 20 ml. of anhydrous pyridine. The resultant mixture is heated on a steam bath for 2 hours and then the pyridine solvent is removed by heating the mixture under reduced pressure. The residual solid is pulverized with 50 ml. of water and then filtered and the precipitate is washed with water and then dried. The solid is then dissolved in 200 ml. of refluxing anhydrous 2-propanol and the resultant solution is treated with charcoal, filtered hot through diatomaceous earth, and then cooled. The crystalline product which forms is separated by filtration and dried to give 2,6-pyridinedimethanol diisonicotinoate melting at about 106–110° C. This compound has the following formula

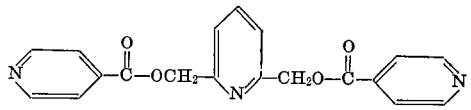

EXAMPLE 3

The procedure of Example 1 is repeated using nicotinoyl chloride and other pyridinedimethanols. Thus the reaction of nicotinoyl chloride with 2,5-pyridinedimethanol and with 3,5-pyridinedimethanol gives the corresponding dinicotionate in each instance.

What is claimed is:
1. A compound of the formula

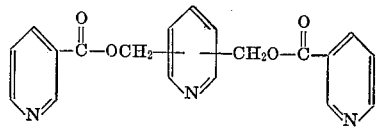

2. A compound according to claim 1 which is 2,6-pyridinedimethanol dinicotinoate.

References Cited

UNITED STATES PATENTS 3,299,077   1/1967   Irikura et al. _____ 260—295.5
3,321,484   5/1967   Krimmel _____ 260—295.5

HENRY R. JILES, Primary Examiner.
ALAN L. ROTMAN, Assistant Examiner.

U.S. Cl. X.R.
71—94; 260—295, 999